United States Patent
Ehrlich

Patent Number: 5,897,174
Date of Patent: Apr. 27, 1999

[54] BRAKING SYSTEM

[75] Inventor: Rodney P. Ehrlich, Monticello, Ind.

[73] Assignee: Wabash National Corporation, Lafayette, Ind.

[21] Appl. No.: 08/699,237

[22] Filed: Aug. 19, 1996

[51] Int. Cl.$^6$ ................................................. B60T 15/02
[52] U.S. Cl. ........................................ 303/40; 137/627.5
[58] Field of Search ................................ 303/40, 28–30, 303/7, 60, 59, 63, 70; 137/627.5

[56] References Cited

U.S. PATENT DOCUMENTS

| | | | |
|---|---|---|---|
| 4,627,668 | 12/1986 | Camm | 303/40 |
| 4,725,101 | 2/1988 | Szudy et al. | 303/40 X |
| 4,786,116 | 11/1988 | Schulz | 303/40 |
| 5,261,458 | 11/1993 | Johnson et al. | 137/627.5 |
| 5,666,995 | 9/1997 | Herbst et al. | 303/40 X |

*Primary Examiner*—Peter M. Poon
*Attorney, Agent, or Firm*—Trexler, Bushnell, Giangiorgi & Blacsktone, Ltd.

[57] ABSTRACT

A braking system for a vehicle includes a pressure relief valve which rids the -system of moisture and liquid therein. The braking system includes a controller which is in fluid communication with the vehicle brakes, an air source, and an air signal that is supplied by the application of the vehicle's brakes. The controller includes piston structure therein which can be moved relative thereto to selectively allow the air from the source to be supplied to the vehicle brakes when a preset air pressure acts against the piston. The piston has a sump therein for collecting any moisture or liquid present in the structure. In an embodiment, the valve includes a vent hole through the piston and a band or ring which overlies the vent hole. The band or ring is preferably positioned around a necked-down portion of the piston. In another embodiment, the sump is effectively eliminated by a plug which overlays the sump and the valve includes a vent hole through an upper portion of the piston and a spring-biased plunger. The band, ring or plunger is moved away from its engagement with the piston when the pressure acting against the piston becomes greater than a preset pressure to vent the moisture and liquid to the vehicle brakes. An upper portion of the piston may be concave to funnel any liquid or moisture present therein into the sump.

21 Claims, 3 Drawing Sheets

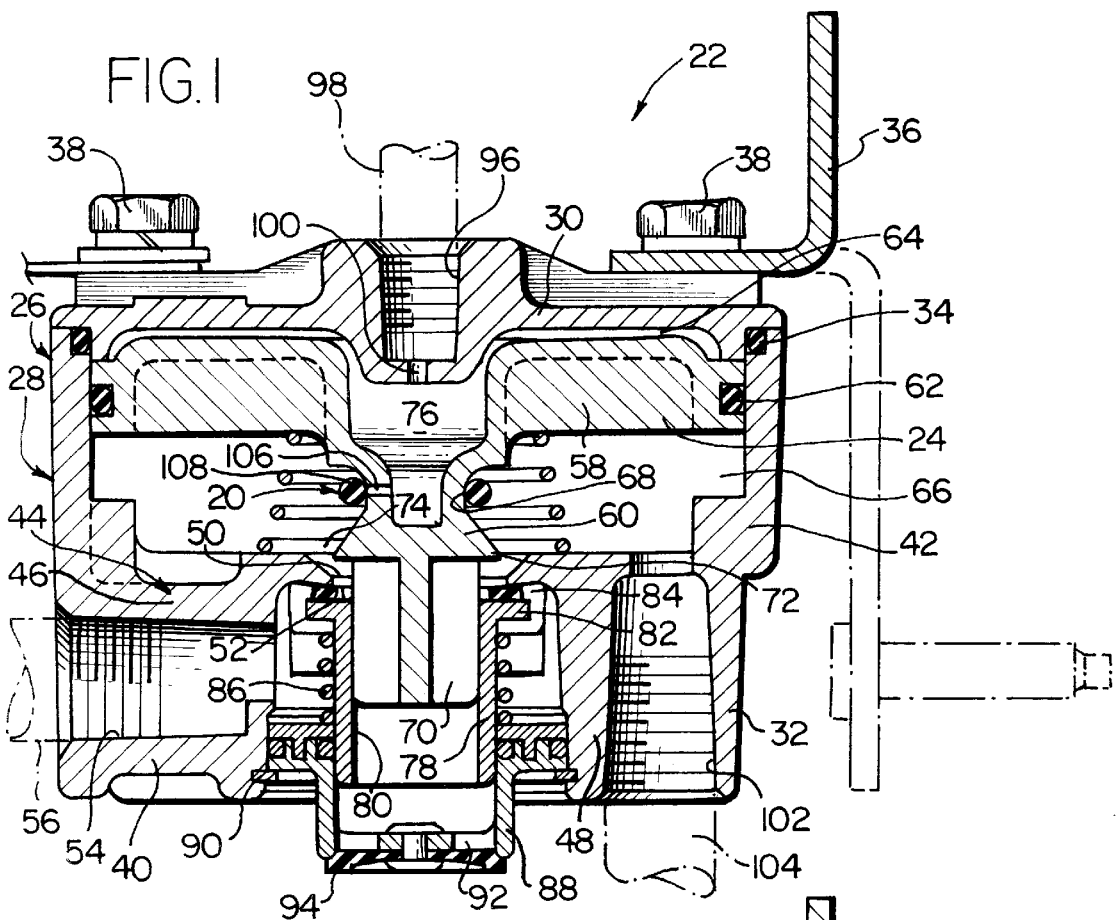
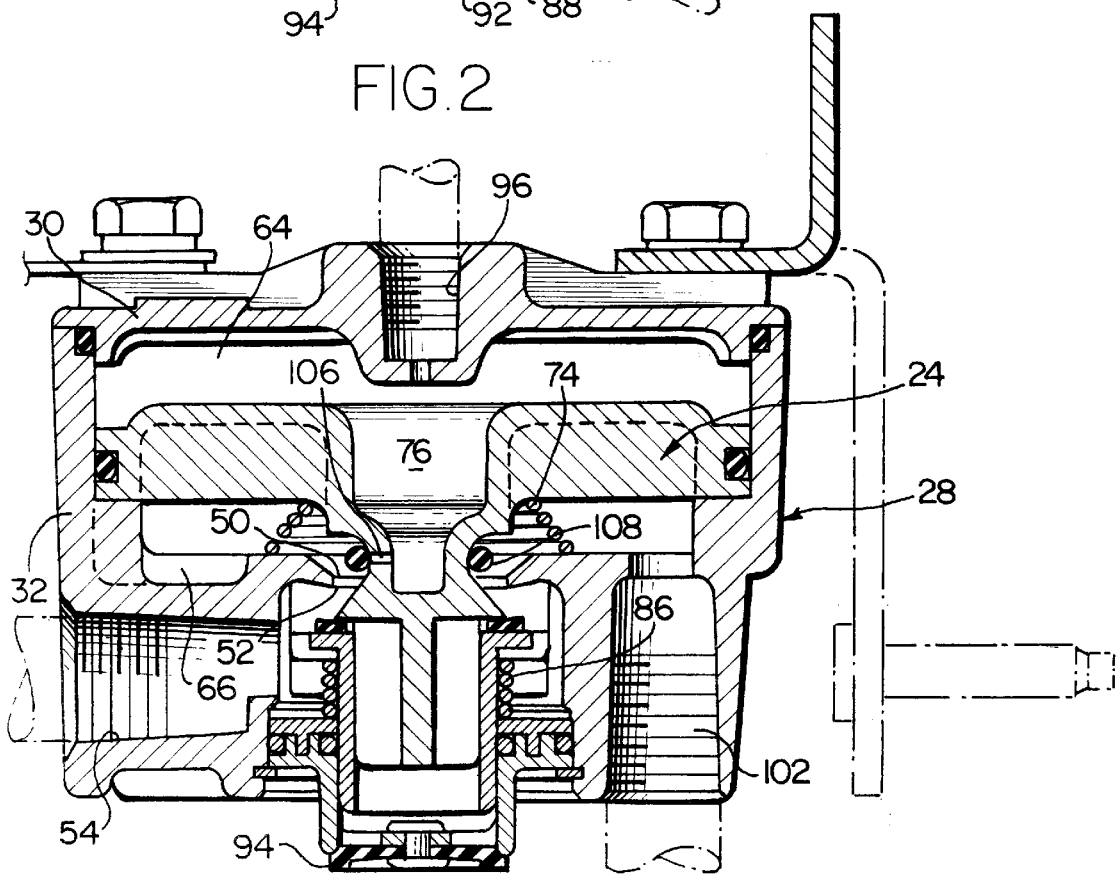

5,897,174

BRAKING SYSTEM

BACKGROUND OF THE INVENTION

This invention is generally directed to a novel controller which is used in an air braking system for a vehicle, such as a semi-trailer or the like, which rids the braking system of any accumulated moisture or liquid therein thereby preventing possible problems in the braking of the vehicle. More particularly, the invention contemplates a braking system which includes a one-way pressure relief valve which is used to rid the braking system of moisture and liquid therein.

Braking systems in semi-trailers commonly include a controller which is in fluid communication with the brakes of the trailer, an air source for supplying air to the brakes of the trailer and an air signal that is supplied from the front of the trailer by the application of the trailer's brakes. The controller includes a piston member which is housed within a housing. The piston member separates the housing into a top chamber and a bottom chamber. The piston member moves relative to the housing to move a spool valve which is associated therewith to selectively allow the air from the source to be supplied to the brakes when a preset air pressure acts against the piston member from the air signal to cause the piston member to move within the housing.

A choke hole is provided at the interconnection of where the air signal is applied to the controller through a signal air inlet port and the top chamber of the housing. The choke hole is used to prevent piston flutter when rapid application, i.e. high pressure, of the air signal is present.

The piston member has a sump therein. When the piston sump fills with liquid, the piston member, in combination with the choke port, acts as a hydraulic dampener which makes the spool valve apply and release very slowly. This is a fairly common problem in the winter due to alcohol being added in the brake line at the front of the trailer air coupling in an attempt to prevent the piston member from freezing.

The alcohol reacts with the plastic material from which the piston member is made and causes the plastic piston member to expand. This deters the brake from releasing which can cause the brakes to lock up and burn.

Even without adding alcohol to the braking system, the braking system sometimes locks up and burns. During summertime operation of the braking system, moisture condenses in the brake lines and is fed by gravity down to the controller which is usually located approximately three to four feet lower than the air connection at the front of the semi-trailer. Over time, as the air signal which has moisture therein is applied and released, moisture accumulates and becomes trapped in the piston sump.

Thus, there is need for an improvement to current braking systems to rid the system of liquid and moisture. The present invention is intended to present such an improvement as well as to present several other advantages which are not found in the prior art.

OBJECTS AND SUMMARY OF THE INVENTION

A general object of the present invention is to provide a controller for use with an air braking system for a vehicle, such as a semi-trailer or the like, which rids the braking system of any accumulated moisture or liquid therein thereby preventing possible problems in the braking of the vehicle.

Another general object of the present invention is to provide an improvement for a braking system which includes a one-way pressure relief valve which is used to rid the braking system of moisture and liquid therein.

Briefly, and in accordance with the foregoing, the present invention discloses a novel one-way pressure relief valve in a controller which is used in an air braking system in a vehicle, such as a semi-trailer or the like, which rids the braking system of any accumulated moisture or liquid therein thereby preventing possible problems in the braking of the vehicle. The one-way pressure relief valve is housed within the controller.

The controller includes a piston member which is housed within a housing. The piston member separates the housing into a top chamber and a bottom chamber. The piston member has an upper portion and a lower portion which extends from the upper portion and into the bottom chamber. The lower portion of the piston member defines a sump for collecting any moisture or liquid which accumulates in the top chamber of the housing. The piston member is movable relative to the housing when a preset air pressure is present in the top chamber. The lower portion of the piston member has a necked-down portion.

An upper signal air inlet port is provided through the housing and is in fluid connection with the top chamber of the controller. The upper signal air inlet port is used to supply an air signal to the top chamber of the housing in response to the application of the brakes of the vehicle. A lower brake actuator inlet port is provided through the housing and is in fluid communication with air from an air source. The air which is supplied through the lower brake actuator inlet port is selectively in fluid communication with the bottom chamber. A lower brake actuating outlet port is also provided through the housing and is in fluid connection with the bottom chamber. The lower brake actuating outlet port is used to supply the air in the bottom chamber to the vehicle's brakes when the piston member is moved in response to the preset air pressure being present in the top chamber to allow air to enter into the bottom chamber from the air source.

A spool valve and seal are provided for preventing fluid communication between the air supplied from the air source and the bottom chamber when the preset air pressure is not present in the top chamber. The spool valve and seal are moved so as to allow fluid communication between the air supplied from the air source through the lower brake actuator inlet port and the bottom chamber when the piston member is moved relative to the housing when the preset air pressure is present in the top chamber.

The one-way pressure relief valve in first and second embodiments of the present invention includes a vent hole through the piston member proximate to the bottom of the sump. The one-way pressure relief valve further includes a ring or band which overlies the vent hole. The ring or band is in engagement with the necked-down portion of the piston member and is moved away from its engagement when the air pressure in the top chamber becomes greater than the preset air pressure. The ring or band re-engages with the necked-down portion when the air pressure in the top chamber becomes less than the preset air pressure. The ring is preferably a rubber O-ring, but may also be made of metal or plastic. The band is preferably rubber or plastic, but may also be made of metal, and engages against a flat portion of the necked-down portion of the piston member.

In either embodiment, the upper portion of the piston member may be generally concave. The concavity of the upper portion funnels any liquid or moisture present in the top chamber into the sump area defined by the necked-down portion.

In another embodiment of the present invention, the sump in the piston member is covered by a cap plug. The cap plug is connected to the piston member and overlays the sump to prevent any moisture or liquid from accumulating therein. The one-way pressure relief valve in this embodiment of the present invention includes a vent hole through the upper portion of the piston member. A spring-biased plunger is in operative communication with the vent hole and opens to open the vent hole when the air pressure in the top chamber becomes greater than the preset air pressure and closes to close the vent hole when the bottom chamber is re-pressurized to a predetermined level.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a cross-sectional view of a controller for use in an air braking system which incorporates the features of a first embodiment of the invention, such controller being in a position wherein air is not being supplied to the brakes of an associated vehicle;

FIG. 2 is a cross-sectional view of the controller shown in FIG. 1, such controller being in a position wherein air is being supplied to the brakes of an associated vehicle;

DETAILED DESCRIPTION OF THE PREFERRED EMBODIMENT

Figure 3:
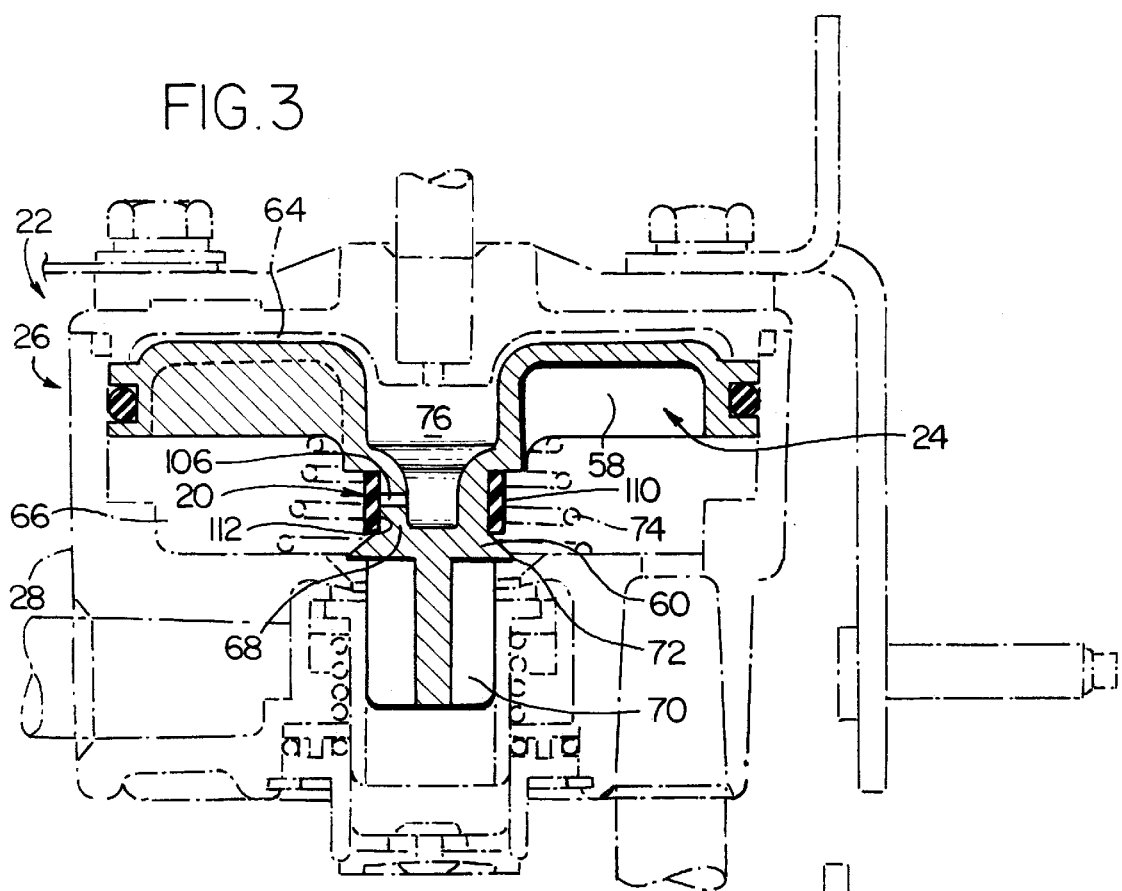
FIG. 3 is a cross-sectional view of a controller for use in an air braking system which incorporates the features of a second embodiment of the invention, such controller being in a position wherein air is not being supplied to the brakes of an associated vehicle.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention presents a one-way pressure relief valve 20 which is used in an air braking system 22 of a vehicle, such as a semi-trailer or the like, to rid the system of moisture and/or liquid which forms or is deposited therein. The one-way pressure relief valve 20 is provided in association with a piston structure which includes a piston member 24 which forms part of a controller 26 in the braking system 22 to allow all of the liquid and/or moisture to be purged from the system 22 while allowing only a small amount of moisture into the system 22.

The controller 26 in the braking system 22 used in accordance with the present invention includes a housing 28 formed of a cover 30 and a body 32. The cover 30 and body 32 are connected together along a juncture and the juncture is sealed by a rubber seal 34 or the like to prevent the entrance of moisture into the housing 28 through the juncture. The cover 30 is attached to a bracket 36, which is mounted on the frame of the vehicle, by suitable means, such as bolts 38 used in combination with washers.

The body 32 includes a bottom wall 40, a side wall 42 and an inner wall 44. The cover 30 forms a top wall which overlays the ends of the body side wall 42 to enclose the housing 28. The inner wall 44 of the body 32 has a first arc-shaped wall section 46 which extends inwardly from the side wall 42. The arc-shaped wall section 46, along with a portion of the bottom wall 40 of the body 32, generally forms a tube. The inner wall 44 of the body 32 includes a second wall section 48 which closes the end of the tube and extends downwardly to the bottom wall 40 of the body 32. The arc-shaped first wall section 46 is interrupted along its top surface to provide an aperture 50 therethrough which is defined by a shoulder 52 in the first wall section 46. The tube defines a brake actuator air inlet port 54 through the side wall 42 of the body 32. The area around the brake actuator air inlet 54 is threaded for connecting a hose 56 or the like thereto. The hose 56 is connected to an air reservoir or source (not shown) for reasons described herein.

The piston member 24 is housed within the body 32 of the housing 28 and is movable relative thereto. The piston member 24 is made of a suitable material, preferably plastic, and includes an upper portion 58 and a lower portion 60 which extends downwardly from the upper portion 58.

The upper portion 58 has an outer margin that corresponds in shape to the inner surface of the side wall 42 of the body 32. The outer margin of the piston member upper portion 58 is sealed to the inner surface of the side wall 42 of the body 32 by a rubber seal 62 or the like. Thus, the piston member 24 divides the housing 28 into a top chamber 64, which is defined by the area between the upper surface of the piston member 24 and the cover 30, and a bottom chamber 66, which is defined by the area between the lower surface of the piston member 24 and the inner wall 44.

The lower portion 60 of the piston member 24 is integrally formed with the upper portion 58. The lower portion 60 of the piston member 24 includes a necked-down portion 68 and a push rod 70 which extends downwardly from the necked-down portion 68. The necked-down portion 68 and the push rod 70 join at a shoulder 72 which extends outwardly from the outermost extent of the push rod 70. The push rod 70 extends downwardly through the aperture 50 formed in the first wall section 46 of the body 32.

The piston structure includes an upper spring member 74 which is provided between the inner wall 44 of the body 32 and the piston member 24. The lower end of the spring member 74 abuts against the upper surface of the inner wall first section 46. The upper end of the spring member 74 abuts against the lower surface of the upper portion 58 of the piston member 24.

A sump 76 is formed in the piston member 24 and is used to collect any moisture and/or liquid in the braking system 22. The sump 76 starts at the top surface of the upper portion 58 of the piston member 24 and generally tapers downwardly into the lower portion 60 of the piston member 24. The sump 76 terminates prior to the push rod 70 of the piston member 24.

The piston structure also includes a spool valve member 78 which is positioned within the inner wall 44 and surrounds a portion of the push rod 70. The spool valve member 78 has a generally cylindrical portion 80 which surrounds the push rod 70 and a shoulder 82 at an upper end of the cylindrical portion 80. The ends of the cylindrical portion 80 are open. The piston member push rod 70 is movable relative to the spool valve member 78. The spool valve member 78 is movable relative to the body 32 of the housing 28.

A rubber seal 84 is positioned between the shoulder 82 of the spool valve member 78 and the shoulder 52 which defines the aperture 50 in the inner wall 44. The seal 84 prevents fluid communication between the brake actuator air inlet port 54 and the bottom chamber 66 in the housing 28 when the braking system 22 is not actuated.

A lower spring member 86 surrounds the exterior of the cylindrical portion 80 of the spool valve member 78 and has a lower end which abuts against a shoulder formed in the bottom wall 40 of the body 32 and an upper end which abuts against the shoulder 82. A retaining clip securely attaches the top of the spring member 86 to the spool valve member 78.

A cap 88 is attached to the bottom wall 40 of the body 32 by a retaining clip 90 and is adjacent to the bottom end of the spool valve member 78. The cap 88 has an exhaust port 92 therethrough in which a rubber flapper cover 94 is mounted. The flapper cover 94 provides a one-way vent that allows excess pressure in the bottom chamber 66 to be bled from the braking system 22. The cap 88 is sealed to the bottom wall 40 of the body 32 by rubber O-ring seals to prevent moisture from entering into the housing 28 through the juncture between the cap 88 and the body 32.

A signal air inlet port 96 is provided through the cover 30 and is in fluid communication with the top chamber 64 of the housing 28. The area around the signal air inlet port 96 is threaded for connecting a hose 98 or the like thereto. The hose 98 is connected to the front of the vehicle for supplying an air signal by the application of the trailer's brakes. A choke hole 100 is provided between the signal air inlet port 96 and the top chamber 64 of the housing 28. The choke hole 100 prevents piston flutter when rapid application, i.e. high pressure, of the air signal is present.

A brake actuating air outlet port 102 is provided through the bottom wall 40 of the body 32 and is in fluid communication with the bottom chamber 66. The area around the brake actuating air outlet port 102 is threaded for connecting a hose 104 or the like thereto. The hose 104 is connected to the brakes of the vehicle for selectively supplying air from the air source to the brakes under predefined conditions as described herein.

When the brakes are not actuated, as shown in FIG. 1, the upper spring member 74 is fully expanded such that the piston member 24 is moved towards the top of the housing 28. The area which forms the top chamber 64 is small compared to the area which forms the bottom chamber 66. The lower spring member 86 is also fully expanded such that the spool valve member 78 is moved to its upper position such that the seal 84 is engaged with the shoulder 52 formed in the inner wall 44. This prevents fluid communication between the air from the air source and the bottom chamber 66 because the air cannot pass through the aperture 50 in the inner wall 44 since it is sealed. Therefore, no air is being supplied from the air source to the vehicle brakes through the brake actuating air outlet port 102.

When the brakes of the vehicle are depressed by the driver, an air signal is sent via hose 98 to the signal air inlet port 96 of the housing 28 to apply air into the top chamber 64 of the controller 26. A signal is also supplied to the air reservoir or source to apply air to the bottom chamber 66 of the controller 26. The air signal passes through the choke hole 100 to pressurize the top chamber 64. Once the pressure in the top chamber 64 reaches a preset level, the piston member 24 is forced to moved downwardly to overcome the force of the upper spring member 74 thereby compressing the spring member 74 as shown in FIG. 2. As the piston member 24 moves downwardly, the shoulder 72 on the lower portion 60 of the piston member 24 moves against the seal 84 thereby causing the seal 84 and spool valve member 78 to move downwardly. As the spool valve member 78 moves downwardly, the lower spring member 86 compresses.

Once the seal 84 disengages from the shoulder 52 in the inner wall 44, the air from the air source is allowed to pass from the brake actuator air inlet port 54 through the aperture 50 and into the bottom chamber 66. The air then passes out the brake actuating air outlet port 102 to the vehicle brakes.

If the pressure in the bottom chamber 66 becomes too great, some of the air is vented to atmosphere through the exhaust port 92. The pressure in the bottom chamber 66 causes the rubber flapper cover 94 to unseat from its engagement with the cap 88 to allow the air to be vented from the controller 26. Once the pressure reduces to a predetermined level, the flapper cover 94 reseals with the cap 88 to prevent the flow of air out the exhaust port 92.

Once the air pressure in the top chamber 64 drops below the preset level, the upper spring member 74 forces the piston member 24 upwardly in the housing 28. The lower spring member 86 forces the spool valve member 78 upwardly in the housing 28 until the seal 84 reengages with the shoulder 52 in the inner wall 44 to block the air flow from the source to the vehicle brakes.

This braking system 22 effectively brakes the vehicle when the system 22 is free from moisture and/or liquid. A problem occurs when moisture and/or liquid is present in the system 22 as described above in the Background of the Invention. To rid the braking system 22 of moisture and/or liquid, the novel one-way pressure relief valve 20 of the present invention is provided.

Directing attention to FIGS. 1 and 2, the necked-down area 68 of the piston member 24 has the one-way pressure relief valve 20 associated therewith for purging any moisture and/or liquid from the braking system 22. The pressure relief valve 20 includes a vent hole 106 which is drilled through the necked-down portion 68 at the base of the sump 76 to provide selective fluid communication between the sump 76 in the piston member 24 and the bottom chamber 66. The pressure relief valve 20 further includes an O-ring 108, which is made of a suitable material, preferably flexible rubber, but may also be made of plastic or metal, which encircles the necked-down area 68 in the lower portion 60 of the piston member 24. The O-ring 108 overlays and covers the vent hole 106.

The O-ring 108 disengages from its engagement with the necked-down portion 68 when the pressure differential between the top chamber 64 and the bottom chamber 66 is greater than the preset pressure which vents the air to the vehicle brakes as described hereinabove. When a large signalling pressure is applied above the piston member 24, a portion of the air will be forced through the drilled vent hole 106 thereby disengaging the O-ring 108 from its engagement with the necked-down portion 68 to open the vent hole 106 thus carrying away any moisture and/or liquid present in the piston sump 76.

The moisture and/or liquid is carried away or blown to the brakes of the vehicle which have a large volume through the brake actuating air outlet port 102. Thereafter, the moisture and/or liquid vaporizes and is dumped to the atmosphere. Some of the moisture and/or liquid may be vented to atmosphere through the exhaust port 92.

As shown in FIG. 3, a band or ring 110 could be used instead of the O-ring 108 as is used in the first embodiment. In this embodiment, the necked down area 68 of the piston member 24 includes a squared-off area 112 for receipt of the band or ring 110 therearound. The band or ring 110 completely covers the drilled vent hole 106 which is proximate to the base of the sump 76. The band or ring 110 is formed of a suitable material, such as plastic or rubber, and may also be made of metal.

The band or ring 110 disengages from its engagement with the necked-down portion 68 when the pressure differential between the top chamber 64 and the bottom chamber 66 is greater than the preset pressure which vents the air to the vehicle brakes as described hereinabove. When a large signalling pressure is applied above the piston member 24, a portion of the air will be forced through the drilled vent hole 106 thereby disengaging the band or ring 110 from its engagement with the necked-down portion 68 to open the vent hole 106 thus carrying away any moisture and/or liquid present in the piston sump 76.

The moisture and/or liquid is carried away or blown to the brakes of the vehicle which have a large volume through the brake actuating air outlet port 102. Thereafter, the moisture and/or liquid vaporizes and is dumped to the atmosphere. Some of the moisture and/or liquid may be vented to atmosphere through the exhaust port 92.

Figure 4:
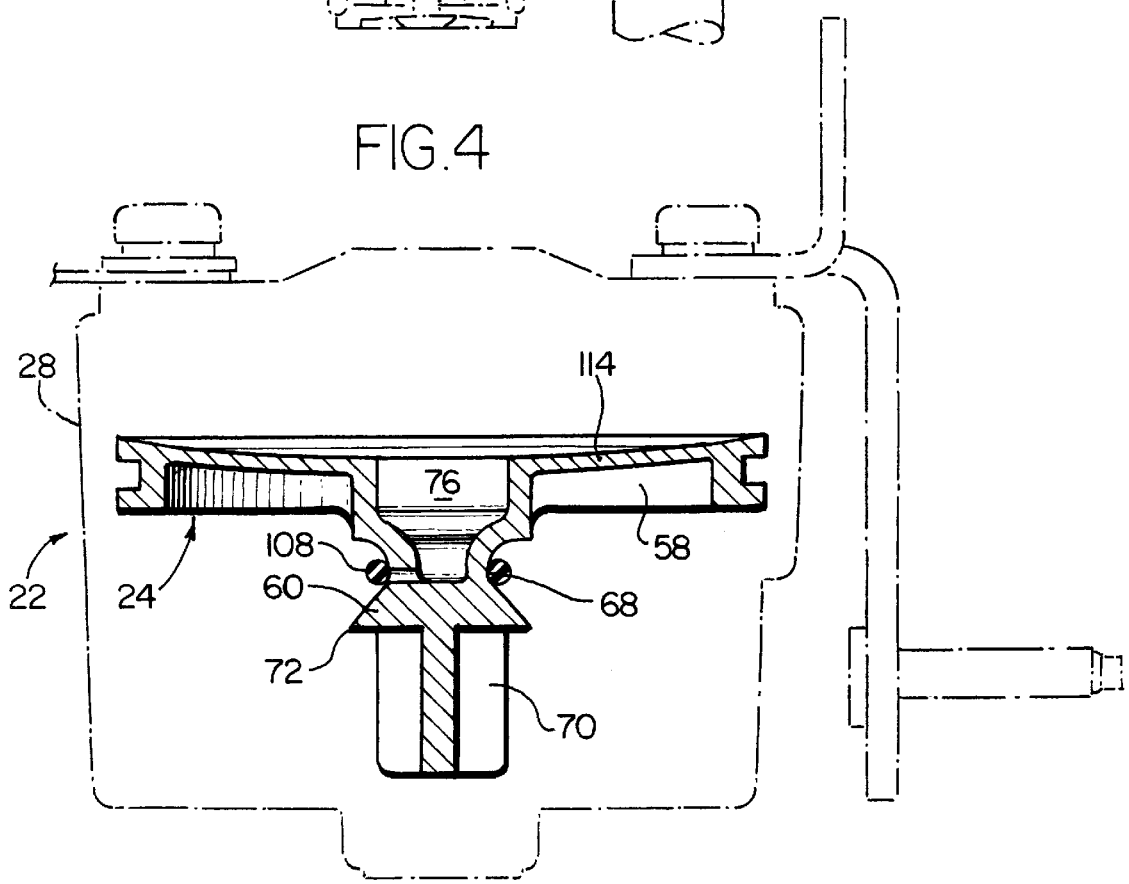
FIG. 4 is a cross-sectional view of a controller which incorporates the features of a third embodiment of the invention.

As shown in FIG. 4, the piston member shape is enhanced by a funnel design provided by a concave upper surface 114 formed in the upper portion 58 of the piston member 24. The concave upper surface 114 ensures that no other sump areas exist in or on the piston member 24 that would allow liquid accumulation therein. The concave upper surface 114 in the upper portion 58 causes all of the moisture and/or liquid in the controller 26 to run into the sump 76.

Figure 5:
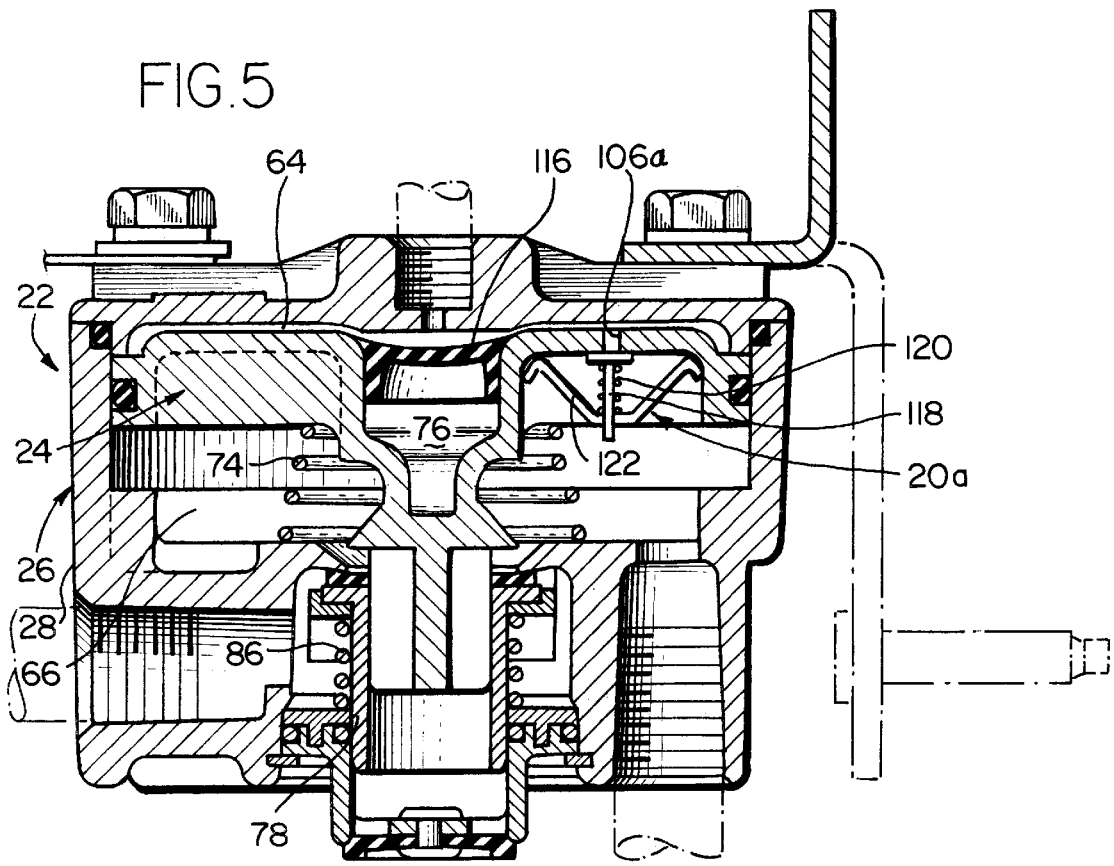
FIG. 5 is a cross-sectional view of a controller for use in an air braking system which incorporates the features of a fourth embodiment of the invention, such controller being in a position wherein air is not being supplied to the brakes of an associated vehicle.
Figure 6:
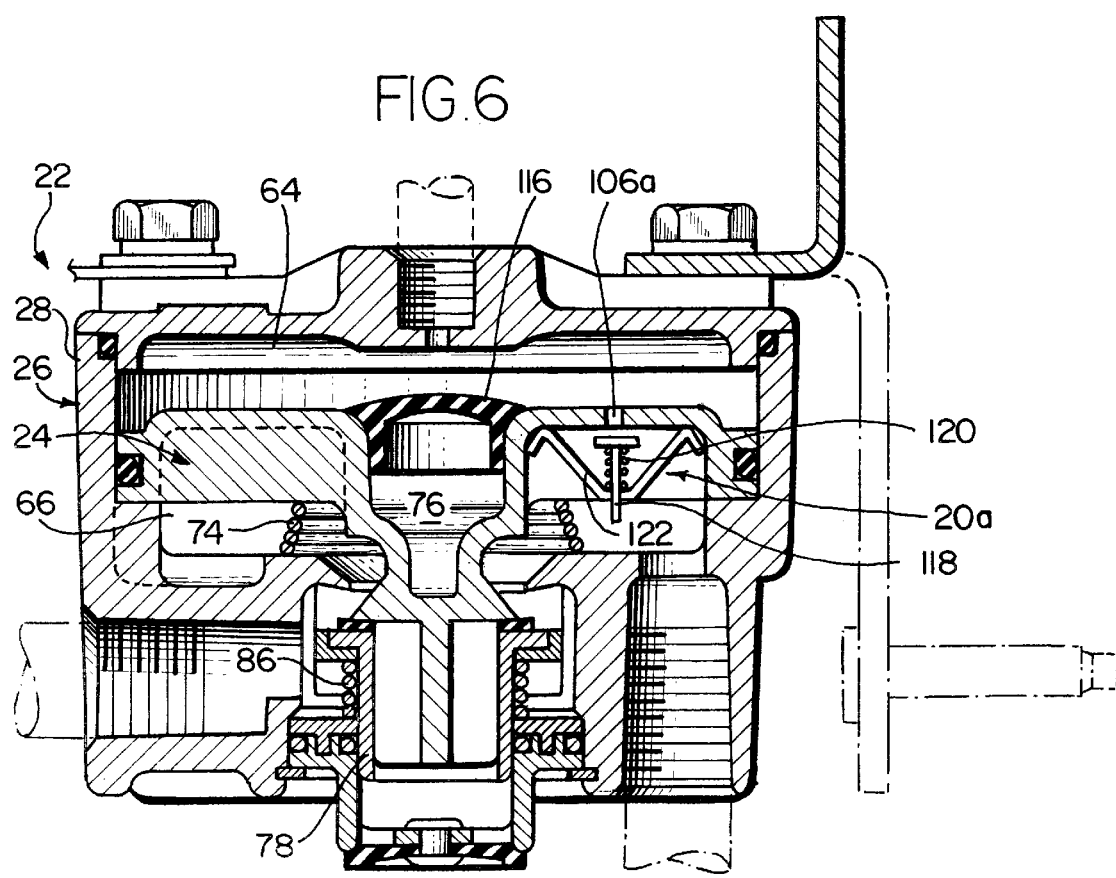
FIG. 6 is a cross-sectional view of the controller shown in FIG. 5, such controller being in a position wherein air is being supplied to the brakes of an associated vehicle.

Alternatively, as shown in FIGS. 5 and 6, the sump 76 in the piston member 24 could effectively be eliminated by the addition of a cap plug 116 thereover. The one-way pressure relief valve 20a is used to vent the moisture and/or liquid to the vehicle brakes. The cap plug 116 is formed of a suitable material, such as rubber.

A vent hole 106a is provided through the upper portion 58 of the piston member 24. A plunger 118, which is biased into engagement with the underside of the upper portion 58 of the piston member 24 by a light spring member 120, is attached to the upper portion 58 of the piston member 24 by members 122. The spring member 120 biases the plunger 118 into engagement with the underside of the upper portion 58 of the piston member 24 when the air pressure in the bottom chamber 66 is at a predetermined level to close the vent hole 106a. Conversely, the spring member 120 is overcome and compressed when the air pressure in the top chamber 64 is greater than the preset air pressure to allow the plunger 118 to move away from its engagement with the vent hole 106a.

FIG. 5 illustrates the braking system 22 in a non-actuated condition as described hereinabove. In addition, the plunger 118 is biased by the spring member 120 into engagement with the underside of the piston member 24 in order to close the vent hole 106a.

When the driver steps on the brake pedal at the front of the semi-trailer, a signal is sent to the service to apply air into the top chamber 64 of the housing 28. When air is supplied into the top chamber 64, the piston member 24 is moved downwardly as shown in FIG. 6. A signal is also supplied to the air reservoir or source to apply air to the bottom chamber 66 of the member. The pressure on the top side of the plunger 118 overcomes the light spring member 120 to open the pressure relief valve thereby venting any moisture and/or liquid to the vehicle brakes which have a large volume. The moisture and/or liquid vaporizes and is dumped to the atmosphere. Some of the moisture and/or liquid may be vented to atmosphere through the exhaust port 92. When the bottom chamber 66 re-pressurizes to a preset amount, the plunger 118 is forced upwardly by the spring member 120 into engagement with the piston member 24 to close the vent hole 106a. It is envisioned that in the embodiment shown in FIGS. 5 and 6, the piston member 24 could be changed to eliminate the sump 76 without the use of a cap plug 116.

While preferred embodiments of the present invention are shown and described, it is envisioned that those skilled in the art may devise various modifications of the present invention without departing from the spirit and scope of the appended claims.

I claim:

1. A controller for use in an air brake system comprising:
    a housing having a signal air inlet for providing signal air to said housing, a brake actuator air inlet and a brake actuating air outlet;
    a piston structure movable within said housing between first and second positions and separating said signal air inlet from said brake actuator air inlet and said brake actuating air outlet, and
    one-way valve means bypassing said piston structure for passing any liquid or moisture entering into the housing with the signal air to the brake actuating air outlet.

2. A controller as defined in claim 1, wherein said piston structure includes a sump therein for collecting any liquid or moisture entering into said housing, said one-way valve means comprising a vent hole through said piston structure and a valve member which overlies said vent hole and is in engagement with said piston structure, said valve member being selectively moved away from said piston structure for passing any liquid or moisture entering into the housing with the signal air to the brake actuating air outlet.

3. A controller as defined in claim 2, wherein said valve member is a rubber ring.

4. A controller as defined in claim 3, wherein said piston structure includes an upper portion and a lower portion, said lower portion including a necked-down portion, said vent hole being proximate to a bottom end of said necked-down portion.

5. A controller as defined in claim 2, wherein said piston structure includes an upper portion and a lower portion, said upper portion of said piston structure being generally concave to funnel any liquid or moisture present in said housing into said sump.

6. A controller as defined in claim 1, wherein said piston structure includes an upper portion and a lower portion, said lower portion including a flat portion, and said one-way valve means comprises a vent hole through said flat portion and a band which overlies said vent hole and is in engagement with said flat portion, said band being selectively moved away from said piston structure for passing any liquid or moisture entering into the housing with the signal air to the brake actuating air outlet.

7. A controller as defined in claim 6, wherein said band is rubber.

8. A controller as defined in claim 6, wherein said band is plastic.

9. A controller as defined in claim 1, wherein said one-way valve means comprises a vent hole through said piston structure and a plunger and a spring member, said spring member causing said plunger to move into engagement with said piston structure, said spring member being overcome when said liquid or moisture is passed to said brake actuating air outlet.

10. A controller for use with an air braking system for a vehicle, the vehicle including brakes, said controller comprising: a housing; a piston structure housed within said housing, said piston structure separating said housing into a top chamber and a bottom chamber, said piston structure having an upper portion and a lower portion extending from said upper portion and into said bottom chamber, said lower portion defining a sump for collecting any moisture or liquid which accumulates in said top chamber of said housing, said piston structure being movable relative to said housing when a preset air pressure is present in said top chamber; an upper inlet port through said housing in fluid connection with said top chamber for supplying an air signal thereto in response to the application of the brakes of the vehicle; a lower inlet port through said housing in fluid communication with air from a source and selectively in fluid communication with said bottom chamber, said piston structure preventing fluid communication between said air supplied from said lower inlet port and said bottom chamber when said preset air pressure is not present in said top chamber and allowing fluid communication between said air supplied from said lower inlet port and said bottom chamber when said preset air pressure is present in said top chamber; a lower outlet port through said housing in fluid connection with said bottom chamber for supplying said air from said bottom chamber to the brakes of the vehicle when said piston structure is moved in response to said preset air pressure being present in said top chamber; and said piston structure further including one-way valve means associated therewith for causing any liquid or moisture which has accumulated in said sump in said top chamber to pass into said bottom chamber and out said outlet port.

11. A controller as defined in claim 10, wherein said one-way valve means comprises a vent hole through said lower portion of said piston structure and a ring which overlies said vent hole and is in engagement with said lower portion, said ring being moved away from said lower portion when the air pressure in said top chamber becomes greater than the preset air pressure and re-engaging with said lower portion when the air pressure in said top chamber becomes less than said preset air pressure.

12. A controller as defined in claim 11, wherein said lower portion of said piston structure includes a necked-down portion and said vent hole is proximate to said necked-down portion.

13. A controller as defined in claim 11, wherein said upper portion of said piston structure is generally concave to funnel any liquid or moisture present in said top chamber into said sump defined by said lower portion of said piston structure.

14. A controller as defined in claim 10, wherein said lower portion of said piston structure includes a flat portion, and said one-way valve means comprises a vent hole through said flat portion and a band which overlies said vent hole and is in engagement with said flat portion, said band being moved away from said flat portion when the air pressure in said top chamber becomes greater than the preset air pressure and re-engaging with said flat portion when the air pressure in said top chamber becomes less than said preset air pressure.

15. A controller as defined in claim 14, wherein said piston structure includes a necked-down portion and said flat portion of said piston structure is provided on said necked-down portion, and said vent hole is proximate to said necked-down portion.

16. A controller as defined in claim 14, wherein said upper portion of said piston structure is generally concave to funnel any liquid or moisture present in said top chamber into said sump.

17. A braking system as defined in claim 10, further including a cap plug connected to said piston structure and overlaying said sump, said cap plug preventing any moisture or liquid accumulation in said sump.

18. A braking system as defined in claim 17, wherein said one-way valve means comprises a vent hole through said upper portion of said piston structure and a plunger and a spring member, said spring member causing said plunger to move into engagement with the upper portion of said piston structure when the air pressure in said bottom chamber is a predetermined level to close said vent hole, said spring member being overcome when the air pressure in said top chamber becomes greater than the preset air pressure to allow said plunger to move away from its engagement with said vent hole.

19. A controller for use with an air braking system for a vehicle, the vehicle including brakes, said controller comprising: a housing; a piston structure housed with said housing, said piston structure separating said housing into a top chamber and a bottom chamber, said piston structure being movable relative to said housing when a preset air pressure is present in said top chamber; an upper inlet port through said housing in fluid connection with said top chamber for supplying an air signal thereto in response to the application of the brakes of the vehicle; a lower inlet port through said housing in fluid communication with air from a source and selectively in fluid communication with said bottom chamber, said piston structure preventing fluid communication between said air supplied from said lower inlet port and said bottom chamber when said preset air pressure is not present in said top chamber and allowing fluid communication between said air supplied from said lower inlet port and said bottom chamber when said piston structure is moved relative to said housing when said preset air pressure is present in said top chamber; a lower outlet port through said housing in fluid connection with said bottom chamber to the brakes of the vehicle when said piston structure is moved in response to said preset air pressure being present in said top chamber; and said piston structure further including one-way valve means for causing any liquid or moisture which has accumulated in said top chamber to pass into said bottom chamber and out said outlet port.

20. A controller as defined in claim 19, wherein said one-way valve means comprises a vent hole through said upper portion of said piston structure and a plunger and a spring member, said spring member causing said plunger to move into engagement with the upper portion of said piston structure when the air pressure in said bottom chamber is greater than a predetermined level to close said vent hole, said spring member being overcome when the air pressure in said top chamber becomes greater than the preset air pressure to move said plunger away from its engagement with said vent hole.

21. A controller as defined in claim 20, wherein said piston structure includes an upper portion and a lower portion extending from said upper portion and into said bottom chamber, said lower portion having a sump therein, and further including a cap plug connected to said piston structure and overlaying said lower portion for preventing any moisture or liquid from accumulating in said sump defined by said lower portion.

* * * * *